United States Patent
Khorrami et al.

(10) Patent No.: US 10,590,605 B2
(45) Date of Patent: Mar. 17, 2020

(54) COATING COMPOSITION FOR CORRUGATED PAPER BOARD

(71) Applicant: HEWLETT-PACKARD DEVELOPMENT COMPANY, L.P., Houston, TX (US)

(72) Inventors: Fereshteh Khorrami, San Diego, CA (US); Xulong Fu, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/093,406

(22) PCT Filed: Jul. 26, 2016

(86) PCT No.: PCT/US2016/044088
§ 371 (c)(1),
(2) Date: Oct. 12, 2018

(87) PCT Pub. No.: WO2018/022020
PCT Pub. Date: Feb. 1, 2018

(65) Prior Publication Data
US 2019/0119855 A1    Apr. 25, 2019

(51) Int. Cl.
*D21H 19/74* (2006.01)
*D21F 11/12* (2006.01)
(Continued)

(52) U.S. Cl.
CPC ............ *D21H 19/74* (2013.01); *B41J 11/002* (2013.01); *B41M 5/506* (2013.01);
(Continued)

(58) Field of Classification Search
None
See application file for complete search history.

(56) References Cited

U.S. PATENT DOCUMENTS

| 5,885,340 A | * | 3/1999 | Bailey | D21H 19/44 |
| | | | | 106/209.1 |
| 6,779,884 B1 | * | 8/2004 | Ma | B41J 2/00 |
| | | | | 347/100 |

(Continued)

FOREIGN PATENT DOCUMENTS

| EP | 1861258 B1 | 12/2014 |
| JP | 2002285495 | 10/2002 |

(Continued)

OTHER PUBLICATIONS

International Search Report and Written Opinion for International Application No. PCT/US2016/044088 dated May 4, 2017, 9 pages.

*Primary Examiner* — Erica S Lin
(74) *Attorney, Agent, or Firm* — Dierker & Kavanaugh PC

(57) ABSTRACT

A coating composition for a corrugated paper board is described. The corrugated paper board includes an inner liner sheet and an outer liner sheet adhered to opposite sides of a corrugated medium. The coating composition includes a pre-coat layer and a topcoat layer. The pre-coat layer includes an ink fixer agent and a pigment, and is disposed on one or both of the liner sheets. The topcoat layer is disposed on top of the pre-coat layer to form an ink receiving layer. The topcoat layer includes a wax and is devoid of the ink fixer agent.

14 Claims, 4 Drawing Sheets

(51) Int. Cl.
| | |
|---|---|
| *D21H 19/40* | (2006.01) |
| *D21H 19/44* | (2006.01) |
| *D21H 19/64* | (2006.01) |
| *D21H 19/82* | (2006.01) |
| *C08K 3/26* | (2006.01) |
| *B41M 5/50* | (2006.01) |
| *C08L 29/04* | (2006.01) |
| *D21H 19/36* | (2006.01) |
| *B41M 5/52* | (2006.01) |
| *D21H 19/84* | (2006.01) |
| *C09D 121/02* | (2006.01) |
| *B41J 11/00* | (2006.01) |
| *C09D 11/02* | (2014.01) |
| *C09D 11/54* | (2014.01) |
| *D21H 19/38* | (2006.01) |
| *D21H 19/60* | (2006.01) |
| *C08L 91/06* | (2006.01) |
| *C08K 3/34* | (2006.01) |

(52) U.S. Cl.
CPC ........ *B41M 5/5218* (2013.01); *B41M 5/5254* (2013.01); *C08K 3/26* (2013.01); *C08L 29/04* (2013.01); *C09D 11/02* (2013.01); *C09D 11/54* (2013.01); *C09D 121/02* (2013.01); *D21F 11/12* (2013.01); *D21H 19/36* (2013.01); *D21H 19/385* (2013.01); *D21H 19/40* (2013.01); *D21H 19/44* (2013.01); *D21H 19/60* (2013.01); *D21H 19/64* (2013.01); *D21H 19/82* (2013.01); *D21H 19/822* (2013.01); *D21H 19/84* (2013.01); *C08K 3/346* (2013.01); *C08K 2003/265* (2013.01); *C08L 91/06* (2013.01)

(56) References Cited

U.S. PATENT DOCUMENTS

| | | |
|---|---|---|
| 7,897,218 B2 | 3/2011 | Missell et al. |
| 8,481,193 B2 | 4/2013 | Romano, Jr. et al. |
| 8,974,877 B2 | 3/2015 | Gane et al. |
| 2003/0049481 A1* | 3/2003 | Tatsuhashi ............... B41M 5/52 428/533 |
| 2011/0293851 A1 | 12/2011 | Bollstrom et al. |

FOREIGN PATENT DOCUMENTS

| | | |
|---|---|---|
| JP | 2010150723 | 7/2010 |
| KR | 20130043473 | 4/2013 |
| WO | WO-2009009285 | 1/2009 |
| WO | WO-2014044778 | 3/2014 |

\* cited by examiner

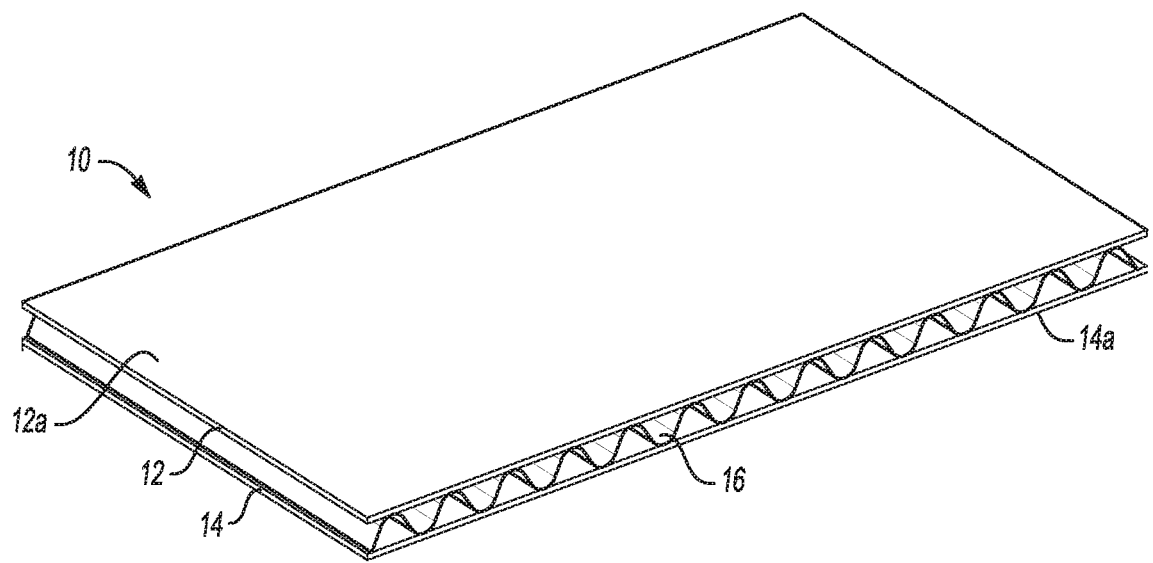

Form a Coating Composition by:
Applying a Pre-Coat Fluid on a First Liner Sheet, wherein the Pre-Coat Fluid Includes an Ink Fixer Agent and a Pigment;
Drying the Applied Pre-Coat Fluid to Form a Pre-Coat Layer;
Applying a Topcoat Fluid on the Pre-Coat Layer, wherein the Topcoat Fluid Includes a Wax and is Devoid of the Ink Fixer Agent;
Drying the Topcoat Fluid to Form a Topcoat Layer — 42

Printing an Ink on the Coating Composition — 44

*Fig-3*

COATING COMPOSITION FOR CORRUGATED PAPER BOARD

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a perspective view of a corrugated paper board, used in the practice of the present teachings, according to an example;

FIG. 3 is a flow chart depicting a method for forming the coating composition disclosed herein, and for printing an ink on the coating composition disclosed herein;

(FIG. 4B) for ink printed on a multilayered coating composition in which a fixer salt is in the top layer of the multilayered coating composition;

(FIG. 5B) for ink printed on a multilayered coating composition in which no fixer salt is present in any layer of the multilayered coating composition;

(FIG. 6B) for ink printed on a multilayered coating composition in which a fixer salt is present in a pre-coat layer of the multilayered coating composition;

DETAILED DESCRIPTION

Figure 2A:
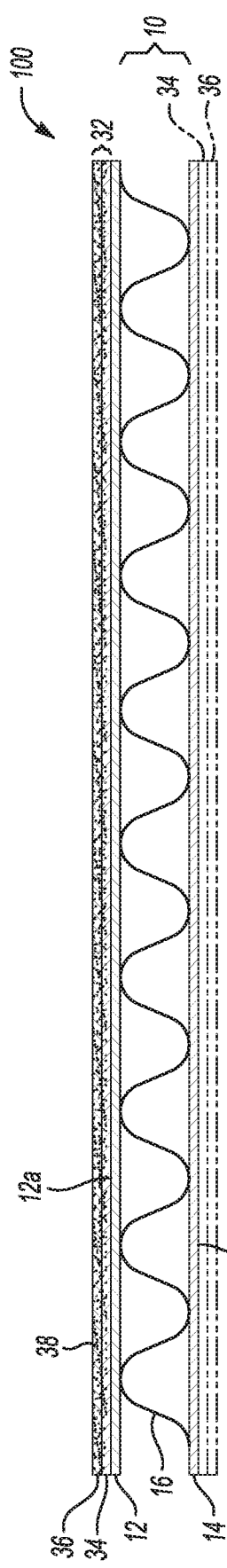
FIG. 2A is an end view of the corrugated paper board shown in FIG. 1 with an example of a pre-coat layer, a topcoat layer, and a printed image on one or both liner sheets of the corrugated paper board.

Corrugated paper board is a material that includes a fluted corrugated sheet and one or two flat linerboards. It is made on flute lamination machines or corrugators and is used in the manufacture of shipping containers and corrugated boxes.

The corrugated medium and linerboard board both are made of kraft containerboard, a paper board material that is usually over 0.01 inches (0.25 mm) thick. FIG. 1 is a perspective view of conventional corrugated paper board 10, made of an outer liner 12, an inner liner 14, and a fluting or corrugated medium 16 sandwiched between the two liners 12, 14. Commonly, the exposed surface 12a of the outer liner 12 is printed (i.e., has an image, text, or the like printed thereon). In some examples, the exposed surface 14a of the inner liner 14 may also be printed.

Figure 2B:
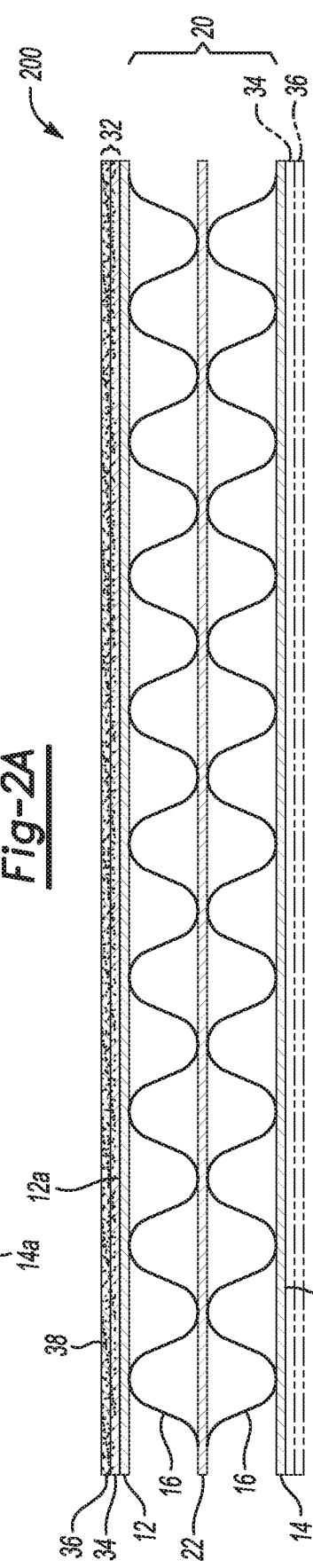
FIGS. 2B and 2C are similar views as FIG. 2A, but showing a double layer paper board (FIG. 2B) and a three layer paper board (FIG. 2C)
Figure 2C:
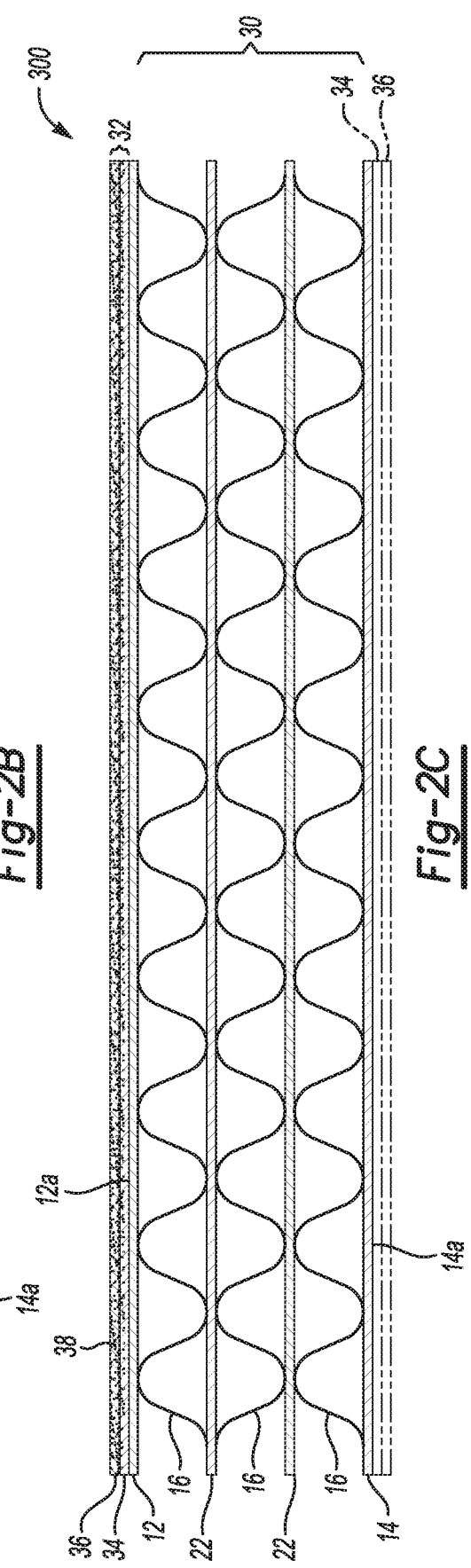

The corrugated paper board 10 may be a single layer paper board, as shown in FIGS. 1 and 2A. Examples of other configurations 20 (double layer paper board) and 30 (three layer paper board) are depicted in FIGS. 2B and 2C, respectively. In FIG. 2B, two layers of the fluting or corrugated medium 16 may be employed, separated by an interior liner 22. In FIG. 2C, three layers of the fluting or corrugated medium 16 may be employed, each separated by an interior liner 22.

Corrugated boxes, which typically include the corrugated media 16 adhered between two liner sheets 12, 14, are often used as shipping containers and may require printing and labels to identify the contents, to provide legal and regulatory information, and to provide bar codes for routing. Boxes that are used for marketing, merchandising, and point-of-sale often have high graphics to help communicate the contents. Corrugated boxes are used for the shipping of a variety of items due to their strength, durability, lightness, recyclability, and cost-effectiveness.

Printing of corrugated boxes may be done by printing on the outer liner sheet 12, and then assembling the printed liner with the corrugated inner media 16 and the inner liner sheet 14 in a corrugator. Also, it may be appreciated that while the outer liner sheet 12 is printed, the inner liner sheet 14 may or may not be printed.

The corrugation process subjects the components, including the print, to elevated temperatures, on the order of about 350° F. (about 177° C.). Such temperatures can degrade the printed image and result in a reduction of image quality, particularly if the ink is an inkjet ink.

Fixer fluid or primer fluid containing salts or organic acids has been successfully used in different types of applications with uncoated and coated media designed for inkjet printing. In these applications, the fixer fluid is applied at the surface of the uncoated or coated media, and the salts or organic acids react with the ink components in the subsequently applied pigmented inkjet ink to fix pigments, which enhances the performance attributes (e.g., reduces bleed and thus improves print quality). However, this approach may not be suitable for the corrugation process. The printed surface of the uncoated or coated media is exposed to a heated plate during the corrugation process, and as a result, the surface and the image at the surface may become scratched. Moreover, the inks, overcoats and varnishes typically used in manufacturing corrugated boxes may be incompatible with the salts or organic acids. This incompatibility can deleteriously affect image quality and/or durability.

In accordance with the teachings herein, a coating composition to print or otherwise apply on a liner sheet of the single layer corrugated paper board 10 (FIG. 2A), the double layer corrugated paper board 20 (FIG. 2B), and/or the three layer corrugated paper board 30 (FIG. 2C) is provided. The coating composition is to receive ink. As such, the coating composition may be printed on or applied to the outer liner sheet 12 and/or the inner liner sheet 14, depending upon which layer(s) 12 and/or 14 is/are to receive the ink.

The present inventors have determined that a two-layer coating composition may solve the problem of the adverse effects on the printed image due to the corrugation process. The two layers of the coating composition disclosed herein are a pre-coat layer and a topcoat layer. Ink is to be printed on the topcoat layer of the coating composition, and thus the topcoat layer may be considered to be an ink receiving layer. The components of the pre-coat layer and the topcoat layer have been selected and incorporated into the respective layers in order to achieve penetration of the ink into the coating composition. Within the coating composition, the penetrated ink contacts an ink fixer agent, where a desirable reaction takes place to fix the pigment. The ink fixer agent fixes the image at or near the pre-coat layer. As such, image quality (e.g., bleed, coalescence, text quality, etc.) is controlled within the coating composition. The topcoat provides protection and minimizes damage to the printed image (ink) in the corrugator during the corrugation process, which, as noted above, subjects the ink to elevated temperatures and other potentially deleterious conditions.

In some instances, the term under may be used in reference to the pre-coat layer and the term upper or top may be used in reference to the topcoat layer. The terms under, top, lower, inner, outer, on, etc. are used herein to describe the corrugated paper board and/or the various layers of the coating composition. It is to be understood that these directional terms are not meant to imply a specific orientation, but are used to designate relative orientation between components. The use of directional terms should not be interpreted to limit the examples disclosed herein to any specific orientation(s).

FIGS. 2A, 2B, and 2C show examples of corrugated paper boards 100, 200, 300, each of which includes the two-layer coating composition 32, made up of the pre-coat layer 34 and the topcoat layer 36, respectively formed on the corrugated paper board 10, 20, 30. The printed image 38 is formed in at least the topcoat layer 36. It is to be understood that the ink used to form the printed image 38 is applied on the topcoat layer 36, but that the ink penetrates into the topcoat layer 36 and reacts with an ink fixer agent that is initially present in the pre-coat layer 34. At least some of the ink fixer agent in the pre-coat layer 34 may migrate into the porous topcoat layer 36. As such, the pigments and/or other ink components that form the printed image 38 are present within one 34 or 36 or both 34 and 36 of the two-layer coating composition 32. As depicted in each of FIGS. 2A-2C, the coating composition 32 and the printed image 38 may be formed on the surface 12a of outer liner sheet 12 and/or on the surface 14a of the inner liner sheet 14.

The pre-coat layer 34 may be printed (or otherwise applied) first on the liner sheet 12 and/or 14. The pre-coat layer 34 contains enough ink fixer agent, or salt, such as, e.g., $CaCl_2$, to aid image quality (IQ), mainly, bleed, coalescence, and text quality. The pre-coat layer 34 may also include a pigment, such as a calcined clay, to assist in controlling the ink penetration and to enhance gloss of the printed image. As printed, the pre-coat layer 34 may have a coating weight ranging from about 5 grams per square meter (gsm) to about 30 gsm.

The topcoat layer 36 may be printed on the pre-coat layer 34. In the topcoat layer 36, ink fixer agent may be omitted; in other words, the topcoat layer 36 may be devoid of the ink fixer agent. The absence of the ink fixer agent in the topcoat layer 36 enhances ink penetration through the topcoat layer 36, in part because the topcoat layer 36 does not include a component that reacts with, and fixes, the pigment in the ink. Enhanced ink penetration through the topcoat layer 36 may ensure that the ink fixer agent (present in the pre-coat layer 34) fixes the printed ink in and/or below the topcoat layer 36. The topcoat layer 36 thereby protects the printed image during the corrugation process.

Further, a wax may be included in the topcoat layer 36. The wax serves to provide a print standoff for surface abrasion during shipping and normal handling/processing. In other words, the wax improves the scratch/rub resistance of the coating composition.

The topcoat layer 36 may also include a pigment (e.g., calcined clay) and precipitated calcium carbonate (precipitated $CaCO_3$; PCC). The calcined clay and precipitated calcium carbonate are suitable for adjusting the media penetration for ink ingredients and for adjusting gloss levels of the resulting printed image. An appropriate ratio of the pigment/clay to the precipitated calcium carbonate may aid in controlling ink penetration and may also allow ink fixer agent diffusion from the pre-coat layer 34 into this upper layer without reaching the surface of the coating composition 32. The ratio ranges from 0 to about 0.7 clay to PCC. As an example, the ratio is 0.67 or 1 part clay:1.5 part PCC.

As printed, the topcoat layer 36 may have a coating weight ranging from about 2 gsm to about 30 gsm.

As shown in FIG. 2A, the corrugated paper board 100 may include two liner sheets 12, 14 adhered to opposite sides of the corrugated medium 16. In other words, the corrugated paper board 100 may include corrugated paper board 10, upon which the coating composition 32 and printed image 38 are formed. As shown in FIG. 2B, the corrugated paper board 200 may include the double layer paper board 20, upon which the coating composition 32 and printed image 38 are formed. As shown in FIG. 2C, the corrugated paper board 300 may include the three layer paper board 30, upon which the coating composition 32 and printed image 38 are formed.

Following printing of a liner sheet 12 and/or 14, the corrugated paper board 100, 200, or 300 may be generated. In the example shown in FIGS. 2A through 2C, the outer liner sheet 12 is the printed outer liner sheet. To form the single layer corrugated paper board 100, the printed outer liner sheet 12, an inner liner sheet 14, and a corrugated medium 16 are assembled in a corrugator, so that the corrugated medium 16 is sandwiched between the two liner sheets, 12, 14. The assembly is oriented so that the printed surface (having the coating composition 32, and in some instances printed image 38, thereon) of the outer liner sheet 12 is the outermost layer on one of the opposite sides. If the inner liner sheet 14 is also printed, the printed surface (having the coating composition 32, and in some instances printed image 38, thereon) is the outermost layer on the other of the opposite sides. To form the boards 200 or 300, two or three corrugated boards 16 with interior liners 22 therebetween may be used instead of one corrugated board 16.

When configured into an object (e.g., a box or shipping container), the outer liner sheet 12 and the coating composition 32 printed thereon may face outward such that it forms the exterior of the object. The inner liner sheet 14 (whether printed on or not), would face inward, toward the interior of the ultimately-formed box or shipping container.

In an example, a coating composition 32 for a corrugated paper board 100, 200, 300 is provided. The corrugated paper board 100, 200, 300 includes an inner liner sheet 14 and an outer liner sheet 12 adhered to opposite sides of a corrugated medium 16. The coating composition 32 may include a pre-coat layer 34 (disposed on one or both of the liner sheets) including an ink fixer agent and a pigment, and a topcoat layer 36 disposed on top of the pre-coat layer 34, to form an ink receiving layer. In an example, the topcoat layer 36 includes a wax and is devoid of the ink fixer agent.

The pre-coat layer 34 may include, in an example, 40 to 70 dry parts of the pigment; 30 to 60 dry parts of a ground calcium carbonate; 5 to 20 dry parts of a latex; and 0.2 to 20 dry parts of the ink fixer agent. In an example, the pre-coat layer 34 may further include up to 1 dry part of a dispersant.

The topcoat layer 36 may include 60 to 100 dry parts of a precipitated calcium carbonate; 5 to 20 dry parts of another latex; 0.5 to 5 dry parts of polyvinyl alcohol; 0.05 to 2 dry parts of a cross-linker; and 1 to 20 dry parts of the wax. In an example, the topcoat layer 36 may further include: i) up to 70 dry parts of calcined clay; or ii) up to 0.2 dry parts of another dispersant; or iii) up to 10 dry parts of a plastic pigment; or iv) any combination of i), ii), and/or iii).

In an example, the pre-coat layer 34 may be formed from a pre-coat fluid, which may include the pigment (e.g., calcined clay), ground calcium carbonate (GCC), a latex, the ink fixer agent (salt), and water. In an example, the pre-coat fluid may further include a dispersant.

The pigment may be a calcined clay, kaolin clay, precipitated calcium carbonate (PCC), modified calcium carbonate (MCC), calcium sulfate, $TiO_2$, talc, etc.

The dispersant, if included, is to disperse the various components as well as contribute to the stability of the pre-coat fluid. Examples of suitable dispersants include polyacrylated salt and polycarboxylated salt.

The latex may be one (or a mixture) that is compatible with the salt and the other pre-coat fluid ingredients, as well as being one that properly forms a film upon drying (to bind the pigment in the film). Examples of suitable latexes include polybutadiene latex, styrene-butadiene copolymer latex, acrylonitrile-butadiene-styrene terpolymer latex, polychloroprene latex, acrylic latex, polyester emulsions, acrylonitrile-butadiene latex, polyvinyl acetate, polyvinyl acetate copolymers (e.g., vinyl acetate—ethylene latex), and combinations thereof.

Examples of the ink fixer agent include water-soluble mono-valent or multi-valent metallic salts. The metallic salt may include a cation of a metal, such as Group I metals, Group II metals, Group III metals, or transition metals, such as sodium, calcium, copper, nickel, magnesium, zinc, barium, iron, aluminum, and chromium, and combinations thereof. The metallic salt may also include anions, such as chloride, iodide, bromide, nitrate, sulfate, sulfite, phosphate, chlorate, and acetate ions, and various combinations thereof. A specific example of a suitable ink fixer agent is calcium chloride ($CaCl_2$).

The balance of the pre-coat fluid is water.

An example of the pre-coat fluid has the following composition: from about 40 to about 70 dry parts of pigment, from 0 to about 1 dry part of dispersant, from about 30 to about 60 dry parts of ground calcium carbonate, from about 5 to about 20 dry parts of latex, from about 0.2 to about 20 dry parts of ink fixer agent, and water.

The dry parts of the pre-coat fluid may be combined with water to form a pre-coat fluid coating including from about 50% to about 60% dry parts, with the balance being water.

The topcoat layer 36 may be formed from a topcoat fluid, which may include precipitated calcium carbonate (PCC), a latex, polyvinyl alcohol, a cross-linker, a wax, and water.

In an example, the topcoat fluid may further include i) a calcined clay (or other suitable pigment), ii) a dispersant, and/or iii) a plastic pigment. For example, the topcoat fluid may further include calcined clay, or a dispersant, or a plastic pigment, or any combination of calcined clay and dispersant; dispersant and plastic pigment; calcined clay and plastic pigment, etc.

The pigment/clay, when included in the topcoat fluid (and thus layer 36), may be the same as the pigment/clay used in the pre-coat fluid (and thus layer 34). As mentioned above, calcined clay may be suitable for the topcoat layer 36, and thus may be included in the topcoat fluid. The pigment/clay, if included, is present in a ratio of pigment/clay to PCC ranging from 0 to about 0.7.

The dispersant, if included, is to disperse the various components and provide better stability to the topcoat fluid. The dispersant in the topcoat fluid may be the same as, or different from the dispersant in the pre-coat fluid.

The latex may be any of the latexes previously described, but is not constrained by the requirements of the pre-coat fluid latex (e.g., salt compatibility, film formability). As such, other latexes may be included in the topcoat fluid.

The cross-linker serves to provide colloidal stability of the topcoat fluid; and examples of the cross-linker include zirconium compounds, aziridines, and isocyanates.

The wax serves to provide scratch resistance and friction reduction; and examples of the wax include polypropylene wax, polyethylene wax (e.g., high density polyethylene (HDPE based wax), polytetrafluoroethylene wax, or the like. The wax that is utilized may depend, in part, upon the temperature of the corrugation process and the melting point of the wax and coating composition.

The plastic pigment, if included, serves to enhance paper gloss; and examples of the plastic pigment include styrene based pigments and/or hollow sphere type polystyrene based pigments.

An example of the topcoat fluid has the following composition: from about 60 to about 100 dry parts of precipitated calcium carbonate, from 0 to about 70 dry parts of pigment, from 0 to about 0.2 dry parts of dispersant, from about 5 to about 20 dry parts of latex, from about 0.5 to about 5 dry parts of polyvinyl alcohol, from about 0.05 to about 2 dry parts of cross-linker, from about 1 to about 20 dry parts of wax, from 0 to about 10 dry parts of plastic pigment, and water.

The dry parts of the topcoat fluid may be combined with water to form a topcoat fluid coating including from about 50% to about 60% dry parts, with the balance being water.

FIG. 3 depicts a method 40 for forming the coating composition 32 on the liner sheet (reference numeral 42), whether the outer liner sheet 12 or the inner liner sheet 14, and for printing an ink on the coating composition 32 (reference numeral 44).

The method 40 includes forming the coating composition 32. Forming the coating composition includes applying (e.g., printing) a pre-coat fluid (undercoat fluid) on a liner sheet 12 and/or 14, wherein the pre-coat fluid includes fixer agent and the pigment. The formation of the coating composition 32 further includes drying the applied/printed pre-coat fluid (undercoat fluid) to form a pre-coat layer 34 (undercoat layer). The drying operation(s) may be performed at ambient temperature or under heat. For example, the drying operation may be performed at about 80° C., or in some examples, at about 100° C., or in still further examples, at 80° C. and then at 100° C. Heating may be performed with an inline heating element to remove the water and produce the pre-coat layer 34.

The method 40 (and in particular the formation of the coating composition 32) continues with applying (e.g., printing) a topcoat fluid on the pre-coat layer 34, and drying the topcoat fluid to form a topcoat layer 36. Drying may be performed in the manner previously described.

The topcoat layer 36 that is formed may be a porous ink receiving layer. The pores permit the colorant (e.g., pigment) in the ink to penetrate through the topcoat layer 36 to the pre-coat layer 34, where the colorant may be fixed by the ink fixer agent that is present in the pre-coat layer 34 and/or that has partially migrated into the topcoat layer 36.

The method 40 concludes with printing an ink on the coating composition 32, thereby forming a printed liner sheet (reference numeral 44). As previously described, the ink penetrates into the topcoat layer 36 and is fixed within the composition 32 by the fixer agent.

The ink may be a digital printable ink that may be deposited, established, or printed on liner sheet 12 and/or 14 using any suitable inkjet printing device. In an example, the ink may be deposited, established, or printed via thermal inkjet printing devices and piezoelectric inkjet printing devices.

The ink that is printed on the coating composition 32 generally includes an ink vehicle (water and co-solvent) and a colorant. More specifically, the ink may include water; a colorant; a binder; the co-solvent; and a surfactant. The colorant in the ink is an anionically dispersed colorant that can react with the ink fixer agent in the coating composition 32. The ink may further include other components common to inkjet inks, such as antimicrobial agents (e.g., biocides and fungicides), anti-kogation agents (for thermal inkjet printing), etc. For some examples of printing on the liner sheet(s) 12 and/or 14, the ink may be chosen from a pigment-based inkjet ink, a pigmented latex-based inkjet ink, a UV curable inkjet ink, a dye-based inkjet ink, or a toner. The ink may be any color, such as black, cyan, magenta, yellow, etc.

Once the liner sheet(s) 12 and/or 14 is(are) printed with the coating composition 32, and in some instances the printed image 38, the two liner sheets 12, 14 and one or more layers of corrugated inner medium 16 may be assembled in the corrugator to form the corrugated paper board 100, 200, 300. At least one of sides 12a (and possibly 14a) of the corrugated paper board 100, 200, 300 is thus printed and ready for assembly into a box or other configuration.

To further illustrate the present disclosure, examples are given herein. It is to be understood that these examples are provided for illustrative purposes and are not to be construed as limiting the scope of the present disclosure.

A property that may approximate the conditions experienced in the corrugator is the hot coefficient of friction (HCOF). This value can be used to ascertain whether a particular print set (ink plus fixer(s)) is likely to survive the corrugation process. The following examples illustrate an improvement in the HCOF when examples of the coating composition are utilized.

EXAMPLES

Example 1

A series of coating compositions was prepared, including a Control and six coating compositions wherein the coating compositions each had two layers, a pre-coat layer, designated P, and a topcoat layer, designated T. Three conditions of inclusion of an ink fixing agent, or salt, here, $CaCl_2$, in the pre-coat layers were prepared: (1) no salt in the pre-coat layer, designated P1; (2) some salt (5 wt %) in the pre-coat layer, designated P2, and (3) double salt (10 wt %) in the pre-coat layer, designated P3. For each P condition, two T conditions were prepared, in which clay was included in the topcoat layer, designated T1, and in which no clay was included in the topcoat layer, but an enhancer (specifically, a wax) was included in the topcoat layer, designated T2.

The formulations of the Control pre-coat and topcoat layers, the pre-coat layers P1, P2, P3, and the topcoat layers T1 and T2 are shown in Tables I and II.

TABLE I

| Ingredient | Control Pre-Coat (Dry parts) | P1 (Dry parts) | P2 (Dry parts) | P3 (Dry parts) |
|---|---|---|---|---|
| Calcined Clay | 60 | 60 | 60 | 60 |
| Dispersant | 0.29 | 0.29 | 0.29 | 0.29 |
| GCC | 40 | 40 | 40 | 40 |
| Latex | 14 | 14 | 14 | 14 |
| Salt | 0 | 0 | 5 | 10 |
| Calcined Clay | 60 | 60 | 60 | 60 |

TABLE II

| Ingredient | Control Topcoat (Dry parts) | T1 (Dry parts) | T2 (Dry parts) |
|---|---|---|---|
| PCC | 80 | 80 | 80 |
| Dispersant | 0.05 | 0.05 | 0.05 |
| Calcined Clay | 20 | 20 | 0 |
| Latex | 7.5 | 7.5 | 7.5 |
| PVOH | 0.5 | 0.5 | 2 |
| CrossLinker* | 0.25 | 0.25 | 0.5 |
| Ultralube D806 (Wax) | 0 | 0 | 2 |
| Plastic pigment | 0 | 0 | 6 |
| Salt | 5 | 0 | 0 |

*an example crosslinker is Sunrez 700M (a urea resin crosslinker commercially available from OMNOVA Solutions Inc., Beachwood, Ohio (formerly Sequa Chemicals. Inc.))

Commercially available 42 lb white top liner paper was used as a base paper. The coating fluids for the control layers, P1, P2, P3, T1 and T2 were prepared in a lab mixer. The dry parts were mixed with water to prepare the coating fluids. The base paper sheets were coated using a lab blade type coater per the combinations set forth in Table III. The base paper was coated with the respective pre-coat fluid (control pre-coat, P1, P2 and P3) first, and then dried. The topcoat fluid (control topcoat, T1, T2) were then applied on top of the dried pre-coat layer and dried. The final coated liner board sheets were calendared using a lab soft nip calender to reach a target gloss level. The coated liner board sheets were printed using a testbed printer, which used the same ink as HP PWP T230 and T300 series web presses.

TABLE III

| Example Name | Pre-Coat Layer | Topcoat Layer |
| --- | --- | --- |
| Control | General Formulation, no salt | General Formulation, plus $CaCl_2$ |
| P1T1 | P1 (no salt) | T1 (clay) |
| P1T2 | P1 (no salt) | T2 (no clay) |
| P2T1 | P2 (5% salt) | T1 (clay) |
| P2T2 | P2 (5% salt) | T2 (no clay) |
| P3T1 | P3 (10% salt) | T1 (clay) |
| P3T2 | P3 (10% salt) | T2 (no clay) |

A number of measurements were made for each of the Control and six coating compositions, including optical density (OD), gloss, extent of bleed of text, coalescence (Coal), and hot coefficient of friction (COF), the latter of which was performed with no overprint varnish (OPV).

Figure 7A:
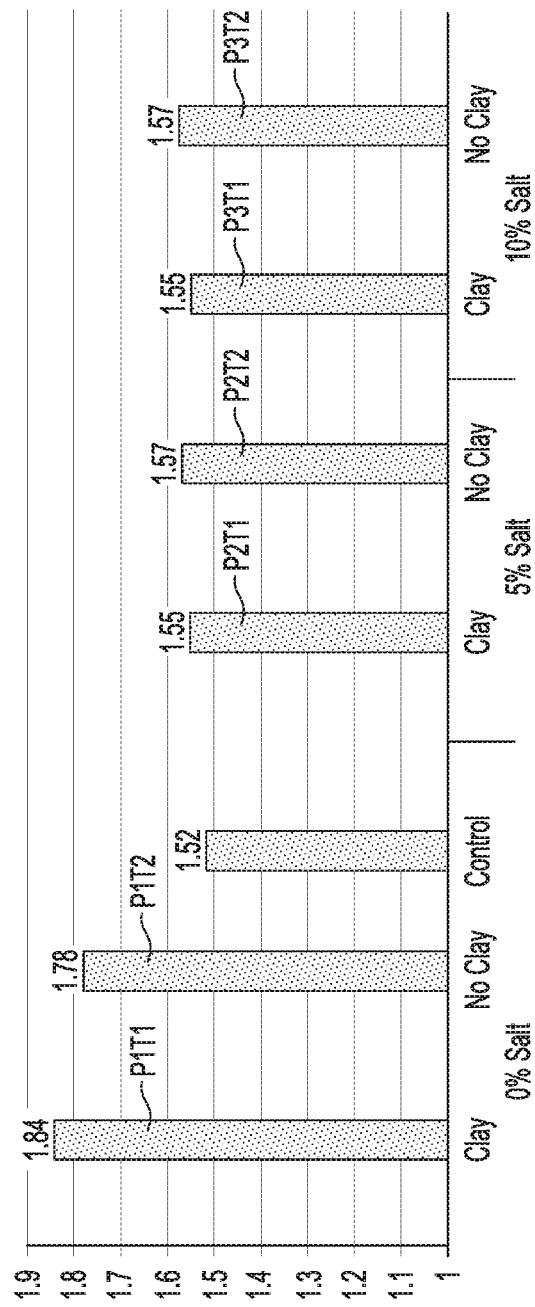
FIG. 7A is a bar graph illustrating optical density (OD) for images formed on media including examples or comparative examples of the coating composition.
Figure 7B:
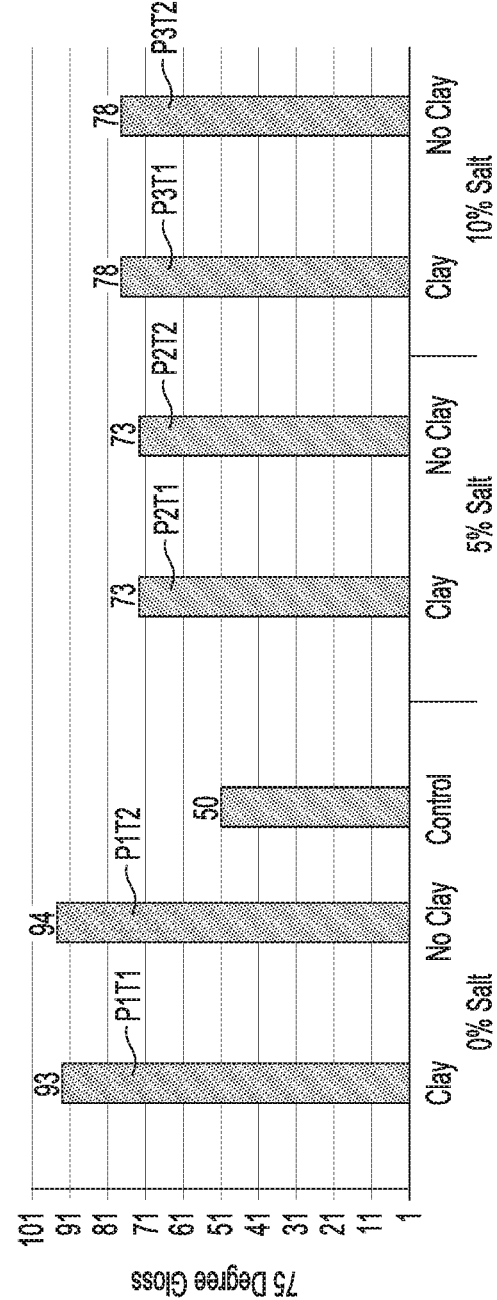
FIG. 7B is a bar graph illustrating 75 degree gloss for images formed on media including examples or comparative examples of the coating composition.

Optical density (OD) was measured using an X-Rite 938 transmission/reflection densitometer. OD was measured using DEN A settings. The gloss level of the coated liner board sheets (i.e., the printed gloss) was measured using a Micro gloss 75, a gloss meter available from BYK-Gardner. These results are shown in FIGS. 7A and 7B, and are also set forth in Table IV.

Bleed was visually evaluated after printing by the naked eye and a handheld microscope. The bleed measurements were ranked as Fail, Marginally Pass, or Pass, as shown in Table IV.

The hot COF test resembled the corrugating facility, where the print and the corrugated back is dragged on a hot metal surface at a temperature ranging from about 330° F. to about 360° F. The hot COF tool test heats up a thin metal piece to 350° F. The dense printed media was placed on the hot metal with a corrugated piece in the back along with a 2 kg weight, and then was dragged at a constant speed for about 1 inch. The hot COF test results are also presented in Table IV.

pre-coat and topcoat layers for Example 1 were used (salt ($CaCl_2$) was included in the topcoat layer). In the second coating composition, the formulations of the Control pre-coat and topcoat layers for were used, except that no salt was included in either the pre-coat layer or the topcoat layer. In the third coating composition, the formulations of P2 and T1 for Example 1 were used, and thus the salt was included in the pre-coat layer only.

Commercially available 42 lb white top liner paper was used as a base paper. The coating fluids were prepared in a lab mixer. The base paper sheets were coated using a lab blade type coater. The base paper was coated with the respective pre-coat fluid first, and then dried. The respective topcoat fluids were then applied on top of the dried pre-coat layer and dried. The final coated liner board sheets were calendared using a lab soft nip calender to reach a target gloss level. The coated liner board sheets were printed using a testbed printer, which used the same ink as HP PWP T230 and T300 series web presses.

Figure 6A:
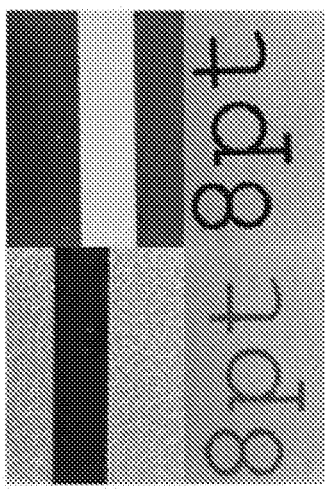
FIGS. 6A-6B are black and white images illustrating examples of bleed control and coalescence (FIG. 6A) and the results of a hot coefficient friction test at 350° F.
Figure 6B:
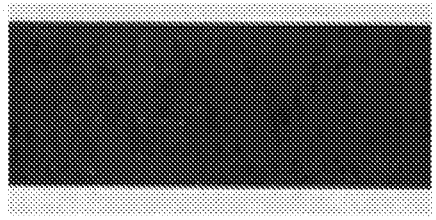
Figure 5A:
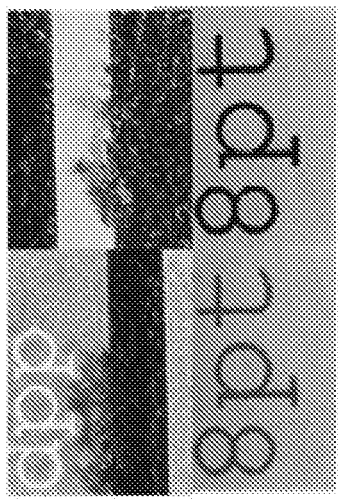
FIGS. 5A-5B are black and white images illustrating examples of bleed control and coalescence (FIG. 5A) and the results of a hot coefficient friction test at 350° F.
Figure 5B:
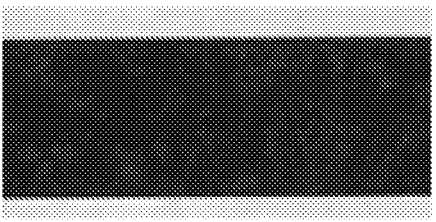
Figure 4A:
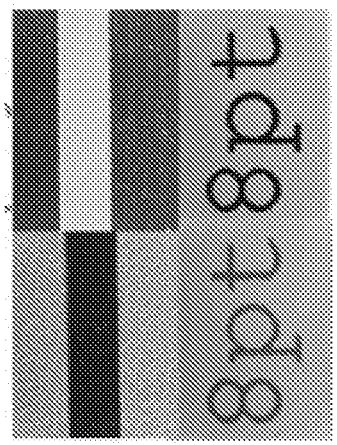
FIGS. 4A-4B are black and white images illustrating examples of bleed control and coalescence (FIG. 4A) and the results of a hot coefficient friction test at 350° F.

The results of printing at 2 dots per pixel (dpp) are shown in FIGS. 4A, 5A, and 6A, respectively. The upper portion of each Figure shows swaths of different colored inks printed adjacent to each other as a test of coalescence. The lower portion of each Figure shows different colored text printed on a background color as a test of bleed. An inspection of the three Figures reveals that the no salt condition (FIG. 5A) exhibits poor bleed, text, and coalescence. Both the Control (salt in the topcoat layer) and salt in the pre-coat layer exhibit similar results (compare FIGS. 4A and 6A). Thus, it can be concluded that the salt (ink fixer agent) is desirable for image quality (IQ; bleed, text, and coalescence) enhancement.

Figure 4B:
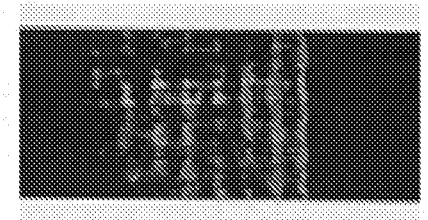

The same three coating compositions were subjected to a hot COF test at 350° F., with no overprint varnish. The results of the test are shown in FIG. 4B (Control, salt in the topcoat layer), 5B (no salt in either layer), and 6B (salt in the pre-coat layer). In this case, both the no salt condition and the salt in the pre-coat layer were superior to the salt in the topcoat layer.

TABLE IV

| | | P1 - No Salt | | P2 - Some Salt | | P3 - Double Salt | |
| --- | --- | --- | --- | --- | --- | --- | --- |
| Compared to Control | Control | T1 Clay | T2 No Clay | T1 Clay | T2 No Clay | T1 Clay | T2 No Clay |
| OD | 1.52 | 1.84 | 1.78 | 1.55 | 1.57 | 1.55 | 1.57 |
| Gloss | 50 | 93 | 94 | 73 | 73 | 78 | 78 |
| Bleed/Txt | Pass | Fail | Marginally Pass | Pass | Pass | Pass | Pass |
| Coal | Pass | Marginally Pass | Marginally Pass | Pass | Pass | Pass | Pass |
| Hot COF - No OPV | Fail | Pass | Pass | Pass | Pass | Pass | Pass |

An inspection of Table IV in conjunction with FIGS. 7A and 7B reveals that while P2 (some salt) is not quite as good as P1 (no salt) in terms of OD and gloss, it is superior to P1 in terms of bleed and coalescence. P2 and P3 (whether combined with T1 or T2) also provide comparable optical density as the Control, and provide better gloss than the Control. P3 (double salt) is as good as P2 in terms of optical density, bleed control, coalescence and hot COF, and also had slightly higher gloss. Thus, overall, P2 and P3 are seen to be the best combination of properties.

Example 2

A series of three coating compositions was prepared, each of which included a pre-coat layer and a topcoat layer. In the first coating composition, the formulations of the Control Overall, these two tests show that the salt in the pre-coat layer is superior to salt in the topcoat layer or no salt in either layer.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 5 gsm to about 30 gsm should be interpreted to include not only the explicitly recited limits of about 5 gsm to about 30 gsm, but also to include individual values, such as 15 gsm, 12.5 gsm, etc., and sub-ranges, such as from about 25 gsm to about 28 gsm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A coating composition for a corrugated paper board, the corrugated paper board including an inner liner sheet and an outer liner sheet adhered to opposite sides of a corrugated medium, the coating composition comprising:
    a pre-coat layer including an ink fixer agent and a pigment, disposed on one or both of the liner sheets, wherein the ink fixer agent consists of a water-soluble mono-valent metallic salt or a water-soluble multi-valent metallic salt, wherein the metallic salt consists of (i) a cation of a metal selected from the group consisting of Group I metals, Group II metals, Group III metals, transition metals, and combinations thereof, and (ii) an anion selected from the group consisting of chloride, iodide, bromide, nitrate, sulfate, sulfite, phosphate, chlorate, acetate, and combinations thereof; and
    a topcoat layer disposed on top of the pre-coat layer, to form an ink receiving layer;
    wherein the topcoat layer includes a wax and is devoid of the ink fixer agent.

2. The coating composition as defined in claim 1 wherein the pre-coat layer includes:
    40 to 70 dry parts of the pigment, wherein the pigment is selected from the group consisting of a calcined clay, kaolin clay, precipitated calcium carbonate, modified calcium carbonate, calcium sulfate, titanium dioxide, and talc;
    30 to 60 dry parts of a ground calcium carbonate;
    5 to 20 dry parts of a latex; and
    0.2 to 20 dry parts of the ink fixer agent.

3. The coating composition as defined in claim 1 wherein the topcoat layer includes:
    60 to 100 dry parts of a precipitated calcium carbonate;
    5 to 20 dry parts of an other latex;
    0.5 to 5 dry parts of polyvinyl alcohol;
    0.05 to 2 dry parts of a cross-linker; and
    1 to 20 dry parts of the wax.

4. The coating composition as defined in claim 2 wherein the pre-coat layer further includes up to 1 dry part of a dispersant.

5. The coating composition as defined in claim 3 wherein the topcoat layer further includes:
    i) up to 70 dry parts of calcined clay; or
    ii) up to 0.2 dry parts of an other dispersant; or
    iii) up to 10 dry parts of a plastic pigment; or
    iv) any combination of i)-iii).

6. The coating composition as defined in claim 5 wherein a ratio of the calcined clay to the precipitated calcium carbonate in the topcoat layer ranges from 0 to about 0.7.

7. The coating composition as defined in claim 3 wherein the wax is selected from the group consisting of polyethylene waxes, polypropylene waxes, and polytetrafluoroethylene waxes.

8. A corrugated paper board, comprising:
    a corrugated medium;
    an inner liner sheet and an outer liner sheet adhered to opposite sides of the corrugated medium; and
    a coating composition formed on one or both of the liner sheets, the coating composition including:
        a pre-coat layer including an ink fixer agent and a pigment, wherein the ink fixer agent consists of a water-soluble mono-valent metallic salt or a water-soluble multi-valent metallic salt, wherein the metallic salt consists of (i) a cation of a metal selected from the group consisting of Group I metals, Group II metals, Group III metals, transition metals, and combinations thereof, and (ii) an anion selected from the group consisting of chloride, iodide, bromide, nitrate, sulfate, sulfite, phosphate, chlorate, acetate, and combinations thereof; and
        a topcoat layer on the pre-coat layer, wherein the topcoat layer includes a wax and is devoid of the ink fixer agent.

9. The corrugated paper board as defined in claim 8 wherein the pre-coat layer includes:
    40 to 70 dry parts of the pigment, wherein the pigment is selected from the group consisting of a calcined clay, kaolin clay, precipitated calcium carbonate, modified calcium carbonate, calcium sulfate, titanium dioxide, and talc;
    30 to 60 dry parts of ground calcium carbonate;
    5 to 20 dry parts of a latex; and
    0.2 to 20 dry parts of the ink fixer agent.

10. The corrugated paper board as defined in claim 8 wherein the topcoat layer includes:
    60 to 100 dry parts of a precipitated calcium carbonate;
    5 to 20 dry parts of an other latex;
    0.5 to 5 dry parts of polyvinyl alcohol;
    0.05 to 2 dry parts of a cross-linker; and
    1 to 20 dry parts of the wax.

11. The corrugated paper board as defined in claim 9 wherein the pre-coat layer further includes up to 1 dry part of a dispersant.

12. The corrugated paper board as defined in claim 10 wherein the topcoat layer further includes:
    i) up to 70 dry parts of calcined clay; or
    ii) up to 0.2 dry parts of an other dispersant; or
    iii) up to 10 dry parts of a plastic pigment; or
    iv) any combination of i)-iii).

13. The corrugated paper board as defined in claim 12 wherein a ratio of the calcined clay to the precipitated calcium carbonate in the topcoat layer ranges from 0 to about 0.7.

14. A method, comprising:
    forming a coating composition by:
        applying a pre-coat fluid on a liner sheet, wherein the pre-coat fluid includes an ink fixer agent and a pigment, wherein the ink fixer agent consists of a water-soluble mono-valent metallic salt or a water-soluble multi-valent metallic salt, wherein the metallic salt consists of (i) a cation of a metal selected from the group consisting of Group I metals, Group II metals, Group III metals, transition metals, and combinations thereof, and (ii) an anion selected from the group consisting of chloride, iodide, bromide, nitrate, sulfate, sulfite, phosphate, chlorate, acetate, and combinations thereof;
        drying the applied pre-coat fluid to form a pre-coat layer;

applying a topcoat fluid on the pre-coat layer, wherein the topcoat fluid includes a wax and is devoid of the ink fixer agent; and drying the topcoat fluid to form a topcoat layer; and printing an ink on the coating composition, thereby forming a printed liner sheet.

\* \* \* \* \*